US010863721B2

(12) United States Patent
Urbanczyk

(10) Patent No.: US 10,863,721 B2
(45) Date of Patent: Dec. 15, 2020

(54) ANIMAL DENTAL CARE DEVICE AND METHOD

(71) Applicant: PETAU LLC, Warren, MI (US)

(72) Inventor: Adam Urbanczyk, Lockport, IL (US)

(*) Notice: Subject to any disclaimer, the term of this patent is extended or adjusted under 35 U.S.C. 154(b) by 79 days.

(21) Appl. No.: 15/662,748

(22) Filed: Jul. 28, 2017

(65) Prior Publication Data

US 2018/0055014 A1    Mar. 1, 2018

Related U.S. Application Data

(63) Continuation-in-part of application No. 29/575,706, filed on Aug. 27, 2016, now Pat. No. Des. 820,538.

(51) Int. Cl.
*A01K 15/02* (2006.01)

(52) U.S. Cl.
CPC .................. *A01K 15/026* (2013.01)

(58) Field of Classification Search
CPC ..... A01K 15/02; A01K 15/025; A01K 15/026
USPC .......................................... 119/702, 707, 709
See application file for complete search history.

(56) References Cited

U.S. PATENT DOCUMENTS

| | | | | |
|---|---|---|---|---|
| 4,052,982 A | * | 10/1977 | Ozeryansky | A61H 7/00 446/236 |
| 4,440,205 A | | 4/1984 | Hillinger | |
| 4,924,811 A | * | 5/1990 | Axelrod | A01K 15/026 119/710 |
| 4,926,558 A | | 5/1990 | Brace | |
| 5,063,948 A | * | 11/1991 | Lloyd | A61C 15/042 132/321 |
| 5,263,436 A | * | 11/1993 | Axelrod | A01K 15/026 119/710 |
| 5,329,881 A | * | 7/1994 | O'Rourke | A01K 15/026 119/709 |
| 5,944,516 A | * | 8/1999 | Deshaies | A01K 15/026 433/1 |
| 6,050,224 A | * | 4/2000 | Owens | A01K 15/026 119/709 |
| D425,267 S | * | 5/2000 | Kengie | D30/160 |

(Continued)

FOREIGN PATENT DOCUMENTS

| | | | | |
|---|---|---|---|---|
| GB | 2476286 A | * | 6/2011 | ........... A01K 15/026 |
| WO | WO-2012050602 A2 | * | 4/2012 | ............. A61C 19/04 |

OTHER PUBLICATIONS

"Gor Pets Flex Spike Ring Dog Chew Toy," Amazon.com; available at https://www.amazon.com/-/GF22/dp/B00NIHYVKW?language=en_US&th=1 (Year: 2015).*

(Continued)

*Primary Examiner* — Lisa L Tsang
(74) *Attorney, Agent, or Firm* — AU LLC; Adam E. Urbanczyk

(57) ABSTRACT

An animal dental care device and method. The device is a ring with inner and outer surfaces on each of which are disposed pluralities of teeth oriented to create channels. When used to care for an animal's dentition, the device is introduced to the animal, causing the animal to bite the device and engage its dentition onto the device's pluralities of teeth. The device is pulled and rotated, causing the animal to release and re-bite the device, playfully reengaging its dentition onto the teeth of the device, the device's teeth efficiently removing plaque and tartar buildup from the animal's dentition.

2 Claims, 8 Drawing Sheets

(56) References Cited

U.S. PATENT DOCUMENTS

| | | | | |
|---|---|---|---|---|
| 6,148,771 | A * | 11/2000 | Costello | A01K 15/026 119/709 |
| 6,739,287 | B1 * | 5/2004 | Sarantis | A01K 15/026 119/702 |
| 7,017,523 | B2 * | 3/2006 | Handelsman | A01K 15/026 119/707 |
| 7,798,106 | B1 * | 9/2010 | Tsengas | A01K 15/026 119/710 |
| D638,735 | S * | 5/2011 | Conway, Jr. | D11/1 |
| D749,803 | S * | 2/2016 | Urbanczyk | D30/160 |
| 9,364,305 | B2 * | 6/2016 | Lynch | A61D 5/00 |
| 2007/0015100 | A1 * | 1/2007 | Morris | A61D 5/00 433/1 |
| 2008/0201881 | A1 * | 8/2008 | Dunn | A01K 15/026 15/106 |
| 2009/0038560 | A1 * | 2/2009 | Markham | A01K 15/026 119/709 |
| 2009/0069848 | A1 * | 3/2009 | Marcus | A61J 17/02 606/235 |
| 2011/0124262 | A1 * | 5/2011 | Buker | A63H 33/18 446/46 |
| 2013/0273125 | A1 * | 10/2013 | Barnvos | A23K 40/20 424/401 |
| 2015/0223594 | A1 * | 8/2015 | Ohanessian | A46B 9/045 15/104.94 |
| 2018/0332823 | A1 * | 11/2018 | Blaisdell | A01K 15/026 |

OTHER PUBLICATIONS

Gor Pets Flex Spike Ring Dog Chew Toy, Amazon. com (enlarged image) (Year: 2015).*

* cited by examiner

ANIMAL DENTAL CARE DEVICE AND METHOD

FIELD OF THE INVENTION

This invention generally relates to animal dental care devices and, more particularly, chew-type devices and methods of use thereof involving dogs.

BACKGROUND OF THE INVENTION

The production and accumulation of plaque and tartar-like substances within the oral cavity, and problems therewith, is not limited to humans. A significant portion of veterinary activity and expenditures thereon involve cleaning the mouths of work animals, zoo animals, and pets. Consistent with this pervasive need, objects and methods for maintaining animal dental care are well known in the prior art, such objects and methods generally being derived from those used for human dental care. Curettes, probes, and picks are generally used in veterinary dentistry just as they are on humans. Tooth brushes, tooth paste, and floss—perhaps the most common dental care implements—may be adapted for use on most animals; however, their effectiveness may be limited by an animal's dentition and the requirement that a person manually perform the dental care service (i.e., the cleaning). Where the animal in question is a small dog, the requirement that the person manually restrain the dog, open the dog's mouth, and brush the dog's teeth may be at best messy and unpleasant for both parties. Where the animal in question is a large dog or dangerous animal, such procedure may be possible only where the animal is heavily sedated or anesthetized, that process alone being potentially dangerous to the animal.

Due to the high cost of veterinary dental services, animal owners will often implement passive techniques to maintain an acceptable level of oral health, seeking formalized veterinary dental care only periodically. These passive techniques often involve the use of toys that provide a teeth-cleaning action ancillary to their entertainment function, or implements which are specifically designed to help clean teeth. Certain examples in the prior art help illustrate common limitations. U.S. Pat. No. 4,924,811 discloses a Therapeutic Device for Cleaning the Teeth of Dogs. This patent discloses a nylon rope formed with knots and tassel ends. Either on its own voluntarily or with the motivation of its owner, a dog will chew the rope, causing the strands of the tassel ends to floss between the dog's teeth. The patent discloses the owner using the knots to hold the invention during "tug of war" interaction with the dog, as well as the rope being formed in a loop. This invention is of limited usefulness as a dental care device as a result of the cleaning mechanism being limited to a flossing action. Even when the tassel strands are aggregated, the abrading surface area ("ASA") of the invention—i.e., the amount surface area provided to engage the surface of the animal's individual tooth or, collectively, teeth—is minimal.

Another U.S. Pat. No. 5,263,436 discloses a Bone-Shaped Therapeutic Device for Dogs. The patent discloses an exceptionally common, yet mechanically inferior, approach to canine tooth cleaning. The patent discloses a chewing device that is shaped like a bone but is covered with a plurality of spikes. The spikes, which are made of the same stiff material as the rest of the device, are designed to scrape accumulated plaque and tarter from a dog's teeth. However, the ASA of such pointed features is minimal, even in the aggregate as claimed, and the "sharpness" of the spikes would act to irritate the target gingival tissue beyond removing any tarter therefrom. When bitten laterally, the device would only be contacting the top surfaces of the dog's bottom teeth and lower surfaces of the dog's upper teeth, those surfaces being among the last places in a dog's mouth on which plaque, and thus tarter, would accumulate anyway. The hardness and "sharpness" of the invention would make it less likely to be tolerated between the dog's flews (i.e., lips), cheeks, and sensitive gingival tissue where plaque and tarter accumulation would be greatest.

Another U.S. Pat. No. 5,329,881 discloses a Dog Chew Toy for Canine Dental Care and Methods for Making Chew Toy. This patent discloses a rope chew toy that is impregnated with a dental agent. Rather than acting as a de facto flossing device, this invention serves primarily as a fluoride delivery system, the fluoride being impregnated into the rope threading and released upon the rope being chewed. Physical removal of accumulated plaque and tartar is incidental to the device chemically treating the dog's teeth.

Another U.S. Pat. No. 5,944,516, discloses an Animal Tooth Cleaning Device and Method. The disclosed device is a compressible tooth brush, relying on an animal biting down onto the device's outer shell and causing inner brush bristles to be exposed and available to contact the animal's teeth. These brush bristles suffer typical cleaning inefficiencies inasmuch as, excepting bristles appearing around the perimeter of the brush, each bristle's ASA is limited to approximately its surface area around and including one of its ends. Even when acting aggregately, the brush bristles ASA and cleaning actions are limited: a dog is unlikely to actuate the bristles in any fashion that will cause the bristles to provide a flossing action, and the bristles only extend in a direction parallel to the dog's biting motion (i.e., against the tooth surface being applied to and deforming the outer shell).

Another U.S. Pat. No. 6,050,224, discloses a Therapeutic Chew Device for Cleaning Teeth and Breath of Dogs. Like the aforementioned U.S. Pat. No. 5,263,436 patent, this reference exemplifies a common, antithetical approach to maintaining animal oral health. Disclosed here is a rope toy threaded through a chewable, charcoal-impregnated piece of rawhide. The rope is tied into knots on either side of chewable rawhide, and both ends of the rope are tassels. The reference discloses the tassel ends providing a flossing function and the charcoal-impregnated rawhide helping to absorb odors and "naturalization properties" to a dog's digestive system. Features which are generally consumable, and particularly those designed to be consumed, work to create and accumulate plaque and tartar and render accompanying removal features inherently less efficient.

A review of the prior art reveals that existing animal dental care devices and methods are, generally, mildly-adapted versions of devices and methods humans would use on their own teeth, despite the significant dental differences between humans and relevant animals. The present invention's innovations, as the Detailed Description will elaborate, address the shortcomings of the prior art.

BRIEF SUMMARY OF THE INVENTION

The present invention is an animal dental care device that comprises a ring having an outer surface and an inner surface. There are defined on each surface two annuli, and on each annulus a plurality of teeth is disposed. The teeth are disposed onto adjacent annuli in counter oriented fashion forming channels between proximate teeth. The ring is made from a pliable yet durable material such as thermoplastic elastomers and other rubber-like substances.

It is an object of the invention to improve animal dental care by providing an efficient mechanical cleaning action. The ring is introduced to an animal's oral cavity, prompting the animal to bite down upon the ring. The animal's teeth—incisors, canines, pre-molars, and molars—pass over the ring's outer and inner surfaces within the channels made between the ring's teeth, allowing the ring's teeth to abrade the animal's teeth and remove accumulated plaque and tartar while maximizing the ring's ASA. Because of the ring's geometry and plurality of teeth disposed onto the ring's inner and outer surfaces, an animal can enjoy the mechanical cleaning action in a number of biting configurations.

It is another object of the invention to encourage animal owners to take a proactive role in their animals' dental care. When introduced to the animal's oral cavity to prompt the animal to bite the ring, the owner can improve the ring's cleaning action by tensing and rotating the ring to encourage successive bites.

BRIEF DESCRIPTION OF THE DRAWINGS

The accompanying figures and drawings, incorporated into and forming part of the specification, service to further illustrate the present invention, its various principles and advantages, and its varying embodiments.

DETAILED DESCRIPTION

Figure 1:
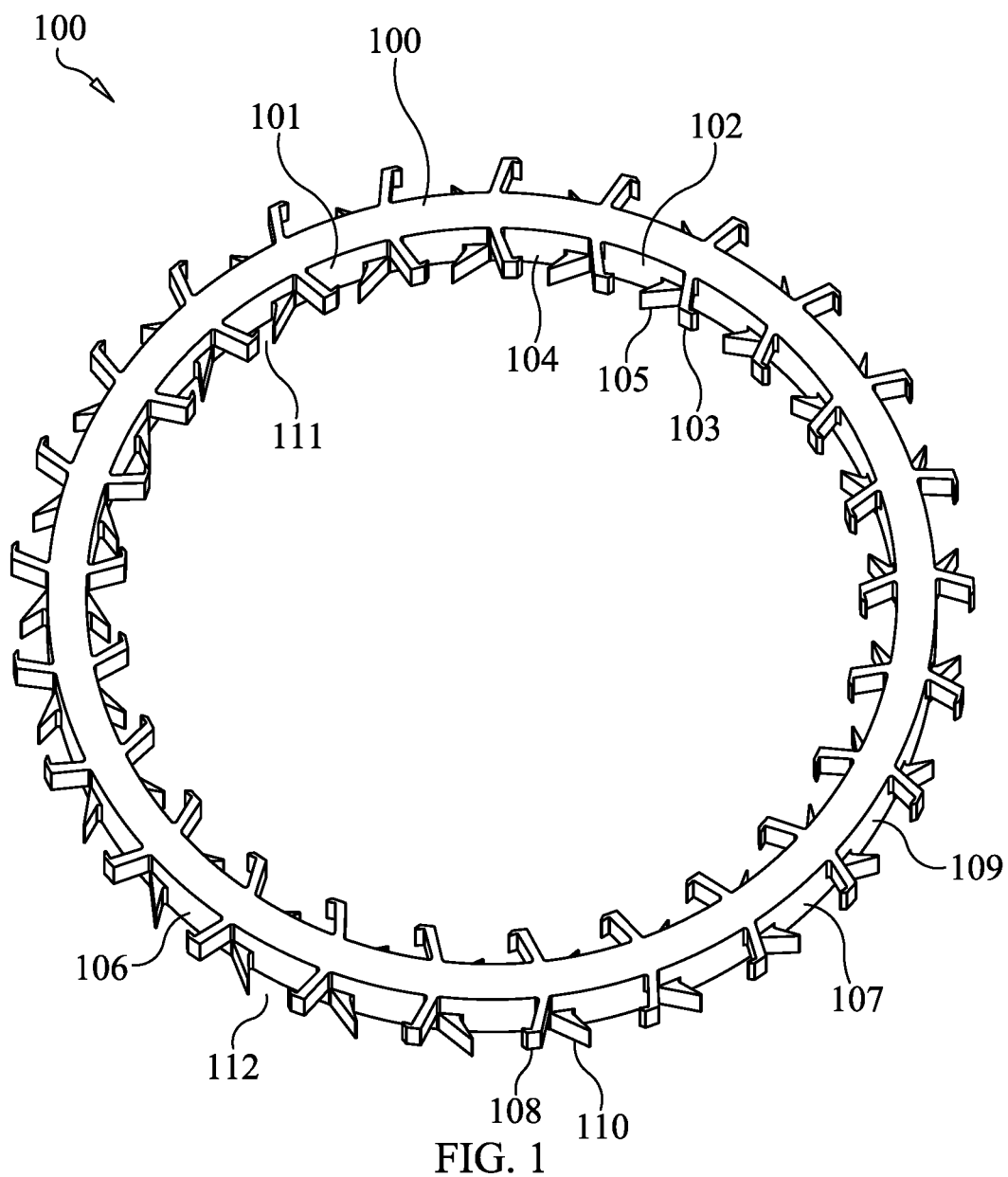
FIG. 1 illustrates an exemplary ring.
Figure 2:
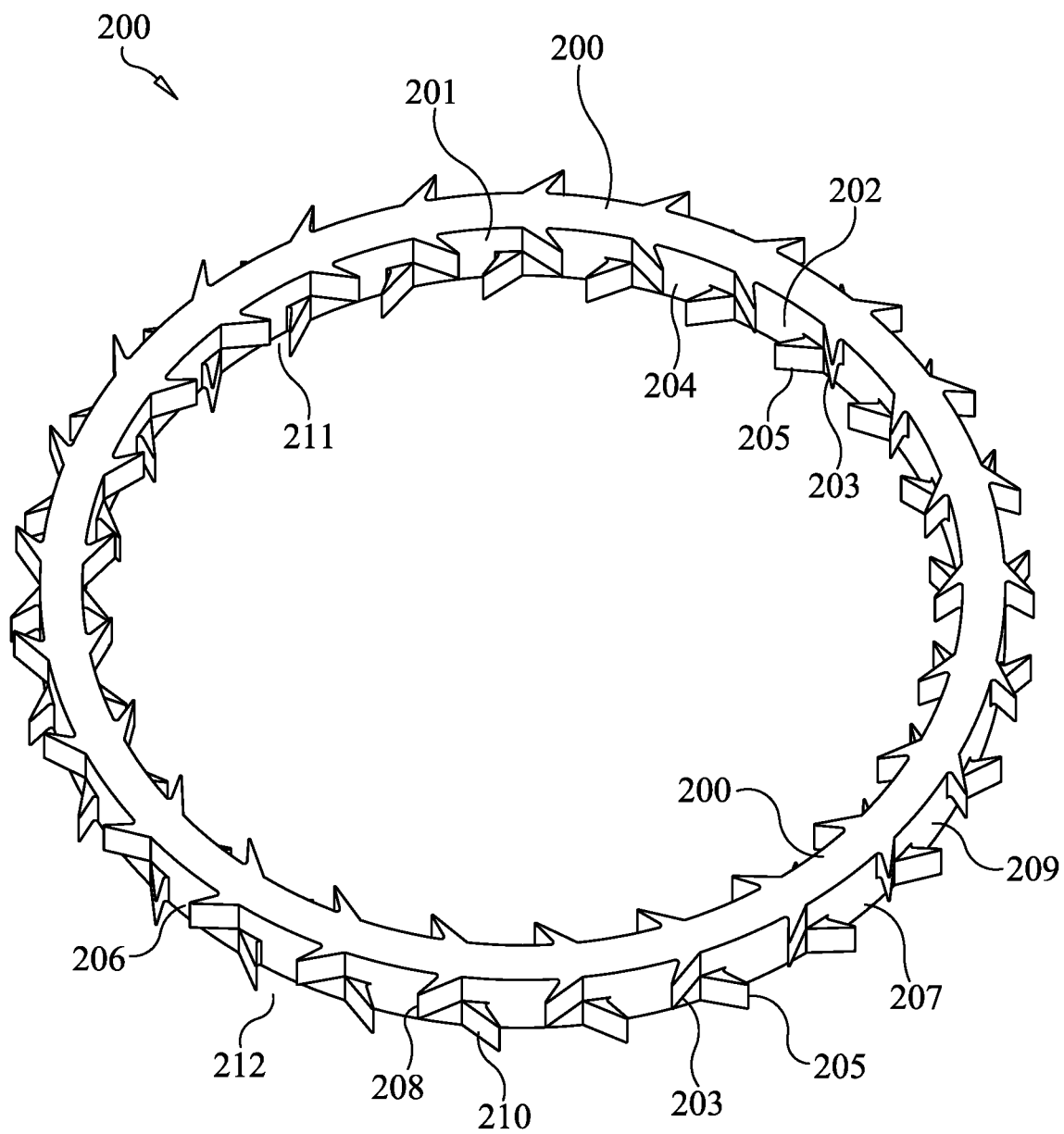
FIG. 2 illustrates an exemplary ring.

Provided is a novel animal dental care device and method involving a ring-like apparatus, FIGS. 1 and 2 illustrating exemplary embodiments thereof. A ring 100, 200 has an inner surface 101, 201 and outer surface 106, 206. The inner surface has a first annulus 102, 202 and second annulus 104, 204. The first annulus has a first plurality of teeth 103, 203 and the second annulus has a second plurality of teeth 105, 205. The first plurality of teeth and second plurality of teeth are counter-oriented and create a first plurality of channels 111, 211. The outer surface has a third annulus 107, 207 and fourth annulus 109, 209. The third annulus has a third plurality of teeth 108, 208 and the fourth annulus has a fourth plurality of teeth 110, 210. The third plurality of teeth and fourth plurality of teeth are counter-oriented and create a second plurality of channels 112, 212.

Figure 3A:
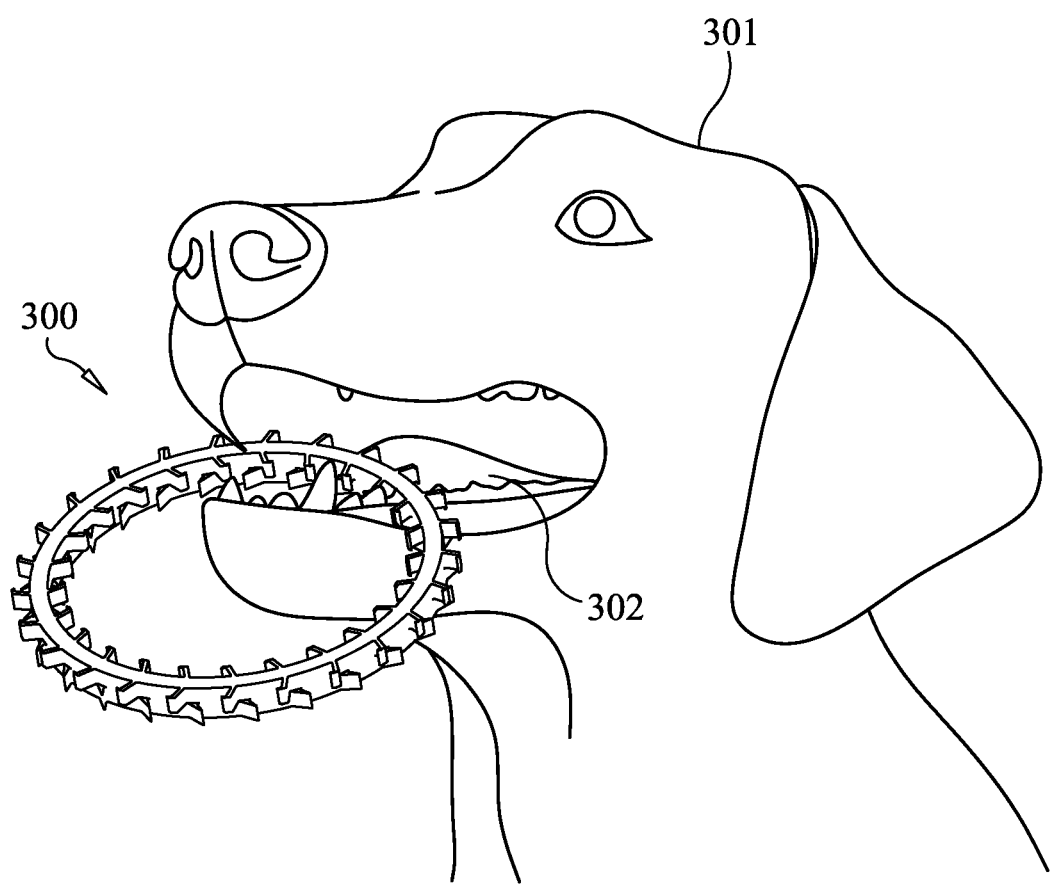
FIG. 3A illustrates a ring being introduced to a dog's oral cavity.
Figure 3B:
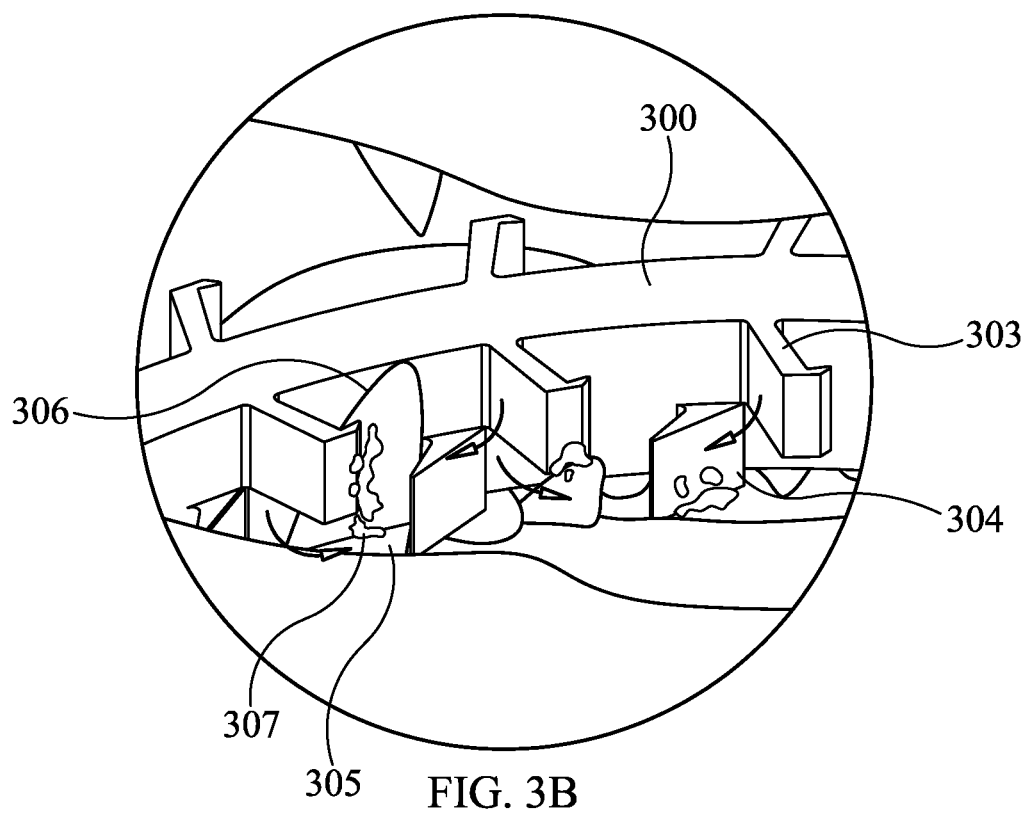
FIG. 3B illustrates a ring engaging a dog's teeth.
Figure 3C:
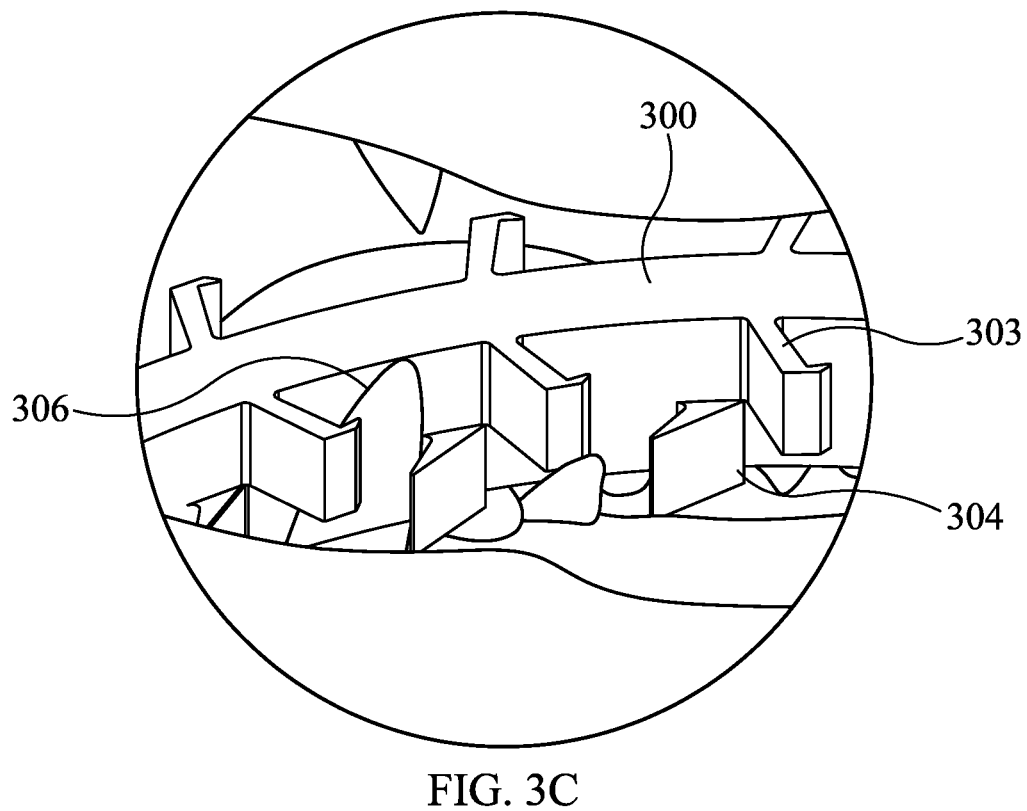
FIG. 3C illustrates pluralities of teeth removing detritus form a dog's teeth.

FIG. 3A introduces how the invention is used to care of animal dentition. The ring 300 is introduced to the oral cavity 302 of a dog 301. FIG. 3B illustrates the ring inside of the oral cavity. A first plurality of teeth 303 and second plurality of teeth 304 form a first plurality of channels 305 one channel of which engages a tooth 306, the tooth initially being covered in detritus (e.g., plaque or tartar). The first plurality of teeth and second plurality of teeth abrade the detritus from the tooth using mechanical action. FIG. 3C illustrates the dog's oral cavity after the ring has been moved within the oral cavity, the first plurality of teeth and second plurality of teeth having removed the detritus from the tooth.

Figure 4A:
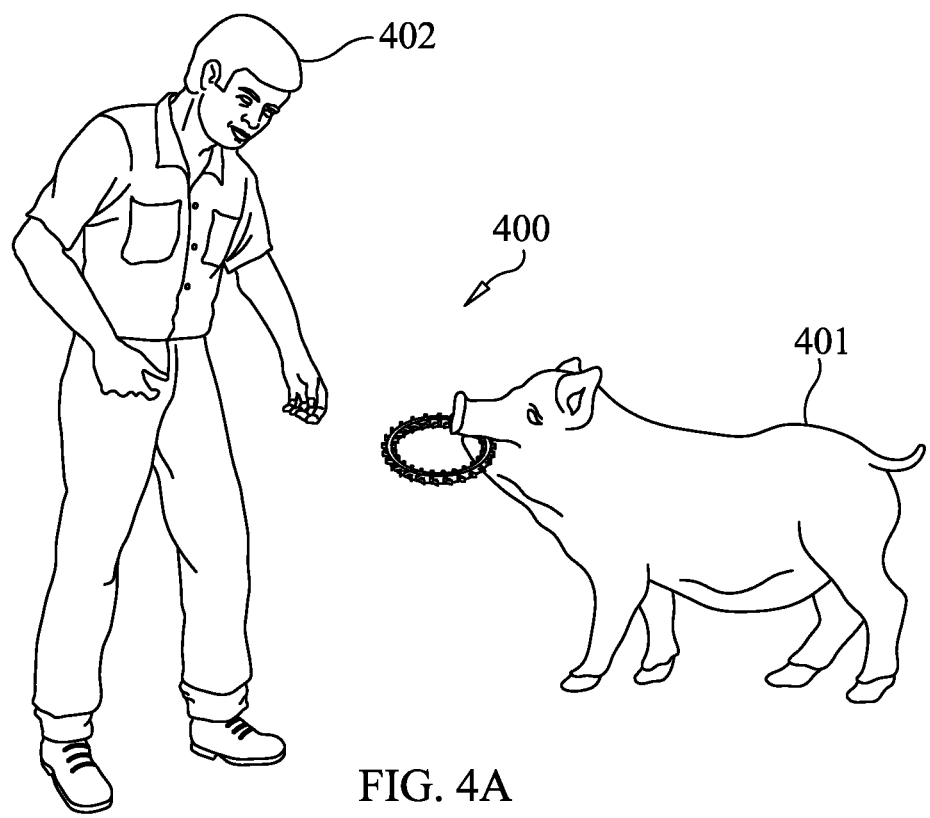
FIG. 4A illustrates a person introducing a ring to a pig.
Figure 4B:
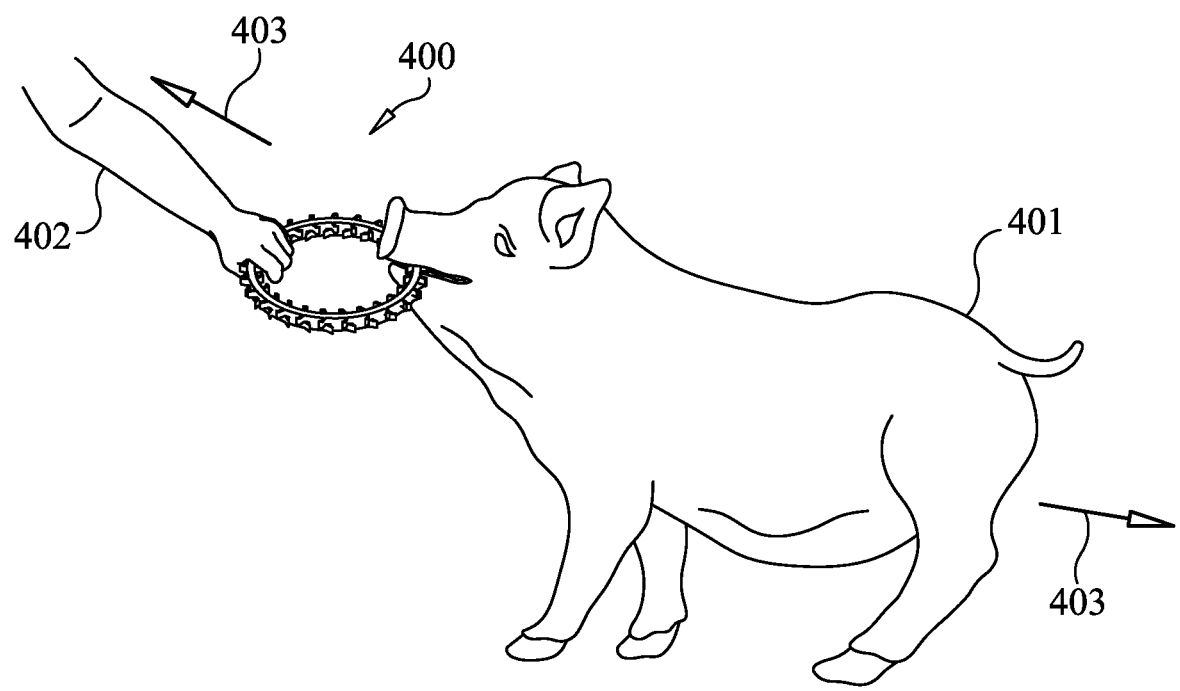
FIG. 4B illustrates a person tensing a ring while a pig bites the ring.
Figure 4C:
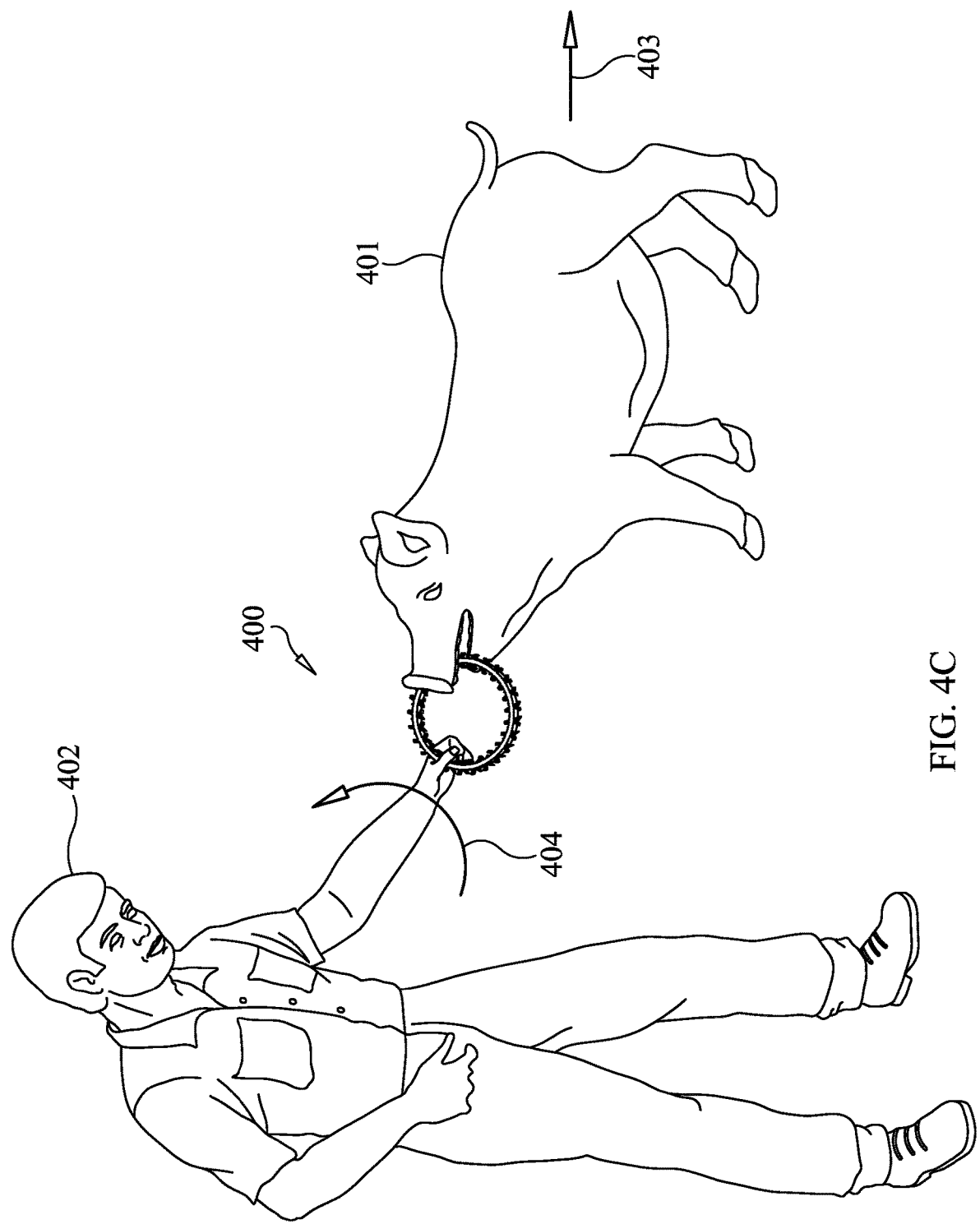
FIG. 4C illustrates a person providing a rotating motion to the ring, causing the pig to release and re-bite the ring.

FIG. 4A illustrates an exemplary method of using claimed invention to care of an animal's dentition. A user 402 encounters a pig 401 which is presenting a ring 400 in its mouth. FIG. 4B illustrates the user providing tension 403 to the ring, causing it to engage the interior of the pig's mouth to improve abrading performance. FIG. 4C illustrates the user providing a rotation action 404 on the ring while maintain tension, further exposing the first, second, third, and fourth pluralities of teeth throughout the interior of the pig's mouth to remove detritus therefrom.

Figure 5A:
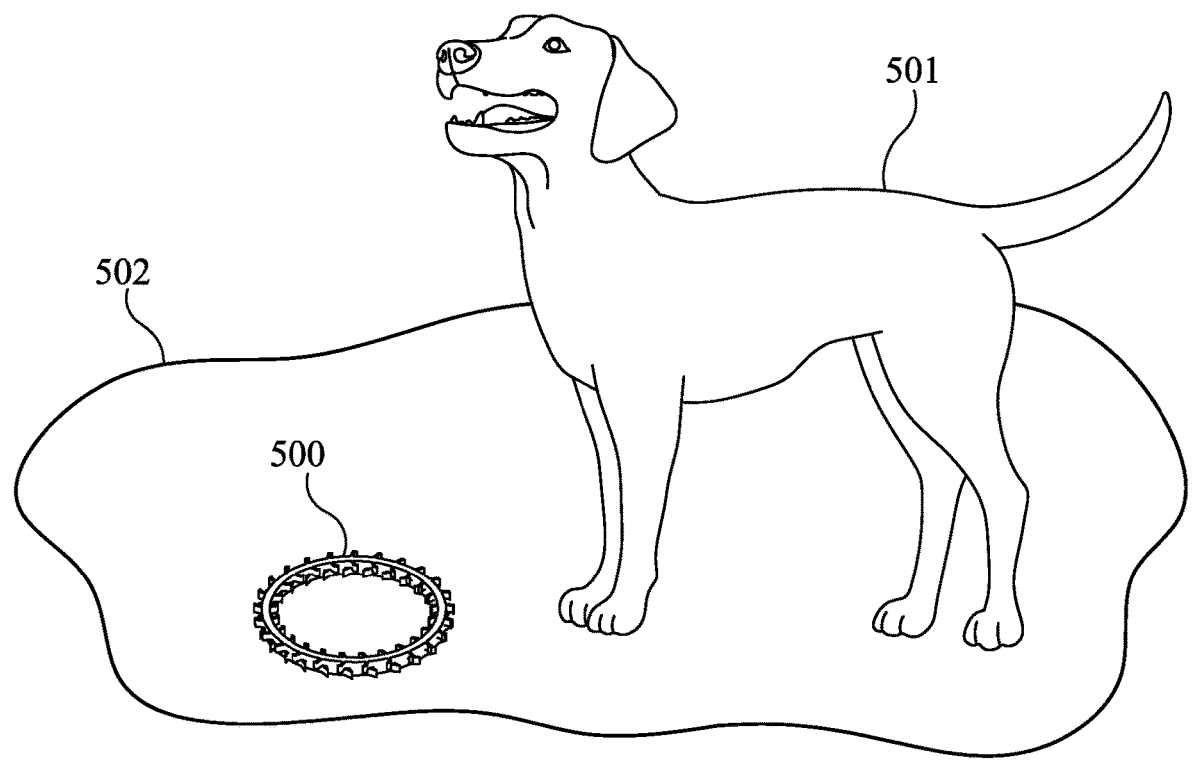
FIG. 5A illustrate a ring presented to a dog on a flat surface.
Figure 5B:
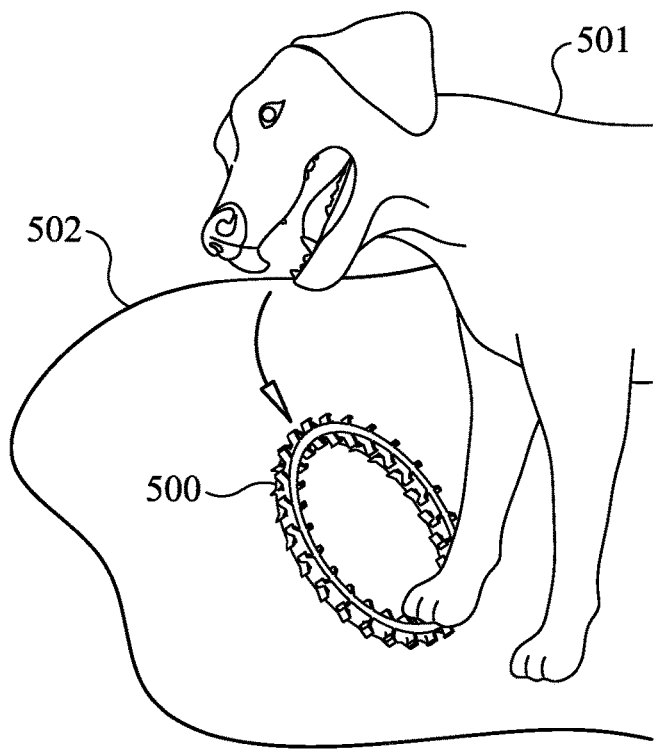
FIG. 5B illustrates a dog using a limb to raise a portion of the ring off of the surface.
Figure 5C:
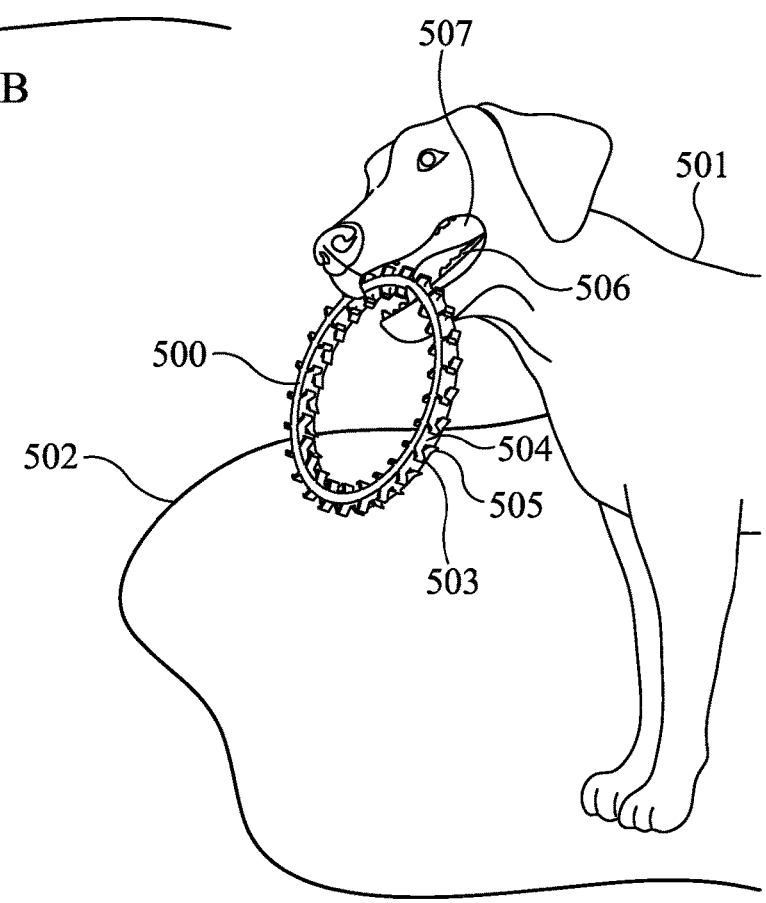
FIG. 5C illustrates a dog using introducing to the raised ring to its oral cavity.

FIG. 5A illustrates another exemplary method of using the ring 500 to care for an animal's dentition. The ring is provided on a substantially flat surface 502. A dog 501 is proximate to the ring. FIG. 5B illustrates the dog using a limb to press upon the ring, the geometry of which causes the ring to raise itself off of the flat surface and towards the dog's head. FIG. 5C illustrates the dog acquiring the ring into the dog's oral cavity 507 and engage at least one tooth 506 by a second plurality of channels 505 formed along with a third plurality of teeth 503 and fourth plurality of teeth.

The ring, being intended to be chewed, pulled, and played with by animals, necessarily is made from an abrasion and tear-resistant material such as thermoplastic elastomers, silicone rubbers, saturated rubbers, and unsaturated rubbers. While an animal may voluntarily engage the apparatus, the animal's owner may encourage the animal's use of the apparatus by introducing the ring to the animal and tensing and rotating the ring once the animal has acquiring the ring into its oral cavity. Moreover, the owner may entice the animal to engage the ring by tossing the ring onto a substantially flat surface prior to the animal retrieving it.

The above detailed descriptions relate to specific preferred embodiments as the inventor presently contemplates, it will be understood that the invention in its broad aspects includes mechanical, chemical, and functional equivalents of the elements described herein. Various details of design and construction may be modified without departing from the true spirit and scope of the invention which is set forth in the following claims. Other embodiments, which will be apparent to those skilled in the art and which practice the teachings herein set forth, are intended to be within the scope and spirit of the invention.

I claim:

1. A method of caring for an animal's dentition comprising the steps of:

providing an animal dental device, the animal dental device comprising a ring having an inner surface and an outer surface, the inner surface having a first annulus and a second annulus, the outer surface having a third annulus and a fourth annulus, a first plurality of teeth disposed onto the first annulus, a second plurality of teeth disposed onto the second annulus, a third plurality of teeth disposed onto the third annulus, and a fourth plurality of teeth disposed onto the fourth annulus, wherein the teeth of the first and third pluralities of teeth are hook shaped and disposed opposite each other on the inner surface and the outer surface, and wherein the teeth of the second and fourth pluralities of teeth are spike shaped and disposed opposite each other on the inner surface and the outer surface;

introducing the animal dental device to the animal's oral cavity;

causing the animal to bite down onto the animal dental device, wherein at least one tooth of the animal engages at least one of the first plurality, the second plurality, the third plurality, or the fourth plurality of teeth;

tensing the animal dental device by applying a pulling force; and rotating the animal dental device, thereby causing the animal to release the animal dental device, in turn causing the animal to bite down onto the animal dental device and exposing the first plurality, the second plurality, the third plurality, and the fourth plurality of teeth throughout the interior of animal's mouth to remove detritus from animal's teeth, wherein at least one tooth of the animal engages at least one of the first plurality, the second plurality, the third plurality, or the fourth plurality of teeth, wherein the first plurality of teeth and the second plurality of teeth are counter oriented forming a first plurality of channels between proximate teeth of the first plurality of teeth and teeth of the second plurality of teeth, and the third plurality of teeth and the fourth plurality of teeth are counter oriented forming a second plurality of channels between proximate teeth of the third plurality of teeth and teeth of the fourth plurality of teeth, and each of the first plurality of channels having a cross-sectional area dimensioned to receive a tooth of the animal therethrough, the corresponding first and second plurality of teeth that form each of the first plurality of channels are positioned to abut multiple sides of the tooth.

2. The method of claim 1, further including providing the animal dental device is made from a physically resilient material selected from the group consisting of thermoplastic elastomers, silicone rubbers, saturated rubbers, and unsaturated rubbers.

\* \* \* \* \*